United States Patent
Bradbury et al.

(10) Patent No.: US 10,083,008 B2
(45) Date of Patent: Sep. 25, 2018

(54) REPRODUCIBLE STOCHASTIC ROUNDING FOR OUT OF ORDER PROCESSORS

(71) Applicant: International Business Machines Corporation, Armonk, NY (US)

(72) Inventors: Jonathan D. Bradbury, Poughkeepsie, NY (US); Steven R. Carlough, Poughkeepsie, NY (US); Brian R. Prasky, Campbell Hall, NY (US); Eric M. Schwarz, Gardiner, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/821,171

(22) Filed: Nov. 22, 2017

(65) Prior Publication Data

US 2018/0113677 A1 Apr. 26, 2018

Related U.S. Application Data

(63) Continuation of application No. 14/986,991, filed on Jan. 4, 2016, now Pat. No. 9,880,811.

(51) Int. Cl.
| | |
|---|---|
| *G06F 7/483* | (2006.01) |
| *G06F 7/58* | (2006.01) |
| *G06F 17/18* | (2006.01) |
| *G06F 7/499* | (2006.01) |

(52) U.S. Cl.
CPC .............. *G06F 7/483* (2013.01); *G06F 7/499* (2013.01); *G06F 7/49947* (2013.01); *G06F 7/58* (2013.01); *G06F 17/18* (2013.01); *G06F 2207/483* (2013.01); *G06F 2207/58* (2013.01)

(58) Field of Classification Search
CPC .............. G06F 7/499; G06F 7/49947–7/49984
USPC ................................... 708/497, 551
See application file for complete search history.

(56) References Cited

U.S. PATENT DOCUMENTS

| | | | | |
|---|---|---|---|---|
| 6,128,726 A | * | 10/2000 | LeComec | G06F 7/5443 708/204 |
| 2004/0078401 A1 | | 4/2004 | Hilton | |
| 2009/0100313 A1 | | 4/2009 | Gross et al. | |
| 2015/0055778 A1 | * | 2/2015 | Cox | H04L 9/0662 380/46 |
| 2017/0102920 A1 | | 4/2017 | Henry et al. | |

* cited by examiner

*Primary Examiner* — Matthew Sandifer
(74) *Attorney, Agent, or Firm* — Cantor Colburn LLP; William A. Kinnaman, Jr.

(57) ABSTRACT

A method for generating a random number for use in a stochastic rounding operation is provided. The method includes executing an instruction that causes at least two operands to produce an intermediate result and incrementing a state of a random number generator. The method d further includes causing the random number generator to generate a random number in accordance with the state and producing a final result by utilizing the random number to determine a rounding of the intermediate result.

1 Claim, 4 Drawing Sheets

Process Flow 200

110→CCCC CCCC CCCC CCCC . CCCC CCCC CCCC CCCC ←120
                                    RRRR RRRR RRRR RRRR
130→DDDD DDDD DDDD DDDD

REPRODUCIBLE STOCHASTIC ROUNDING FOR OUT OF ORDER PROCESSORS

This application is a continuation of U.S. application Ser. No. 14/986,991 which was filed on Jan. 4, 2016. The entire disclosures of U.S. application Ser. No. 14/986,991 are incorporated herein by reference.

BACKGROUND

The disclosure relates generally to reproducible stochastic rounding for out of order processors.

In general, machine learning and neural network applications require a method of rounding results using a random value to determine if a fractional part of an intermediate result should cause an increment (rounding up) or truncation (rounding down) of the final result. This becomes a problem for contemporary implementations of these applications when it is necessary to generate reproducible results, particularly considering today's out of order processors. Reproducible results are required for many reasons, including hardware validation during initial system test. For example, if a same code is run on a different processor, it is necessary that the two processors generate the same final result.

SUMMARY

According to one embodiment, a method for generating a random number for use in a stochastic rounding operation is provided. The method includes executing an instruction that causes at least two operands to produce an intermediate result and incrementing a state of a random number generator. The method d further includes causing the random number generator to generate a random number in accordance with the state and producing a final result by utilizing the random number to determine a rounding of the intermediate result. The method may be embodied in a system and/or computer program product.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 1 illustrates an example of a stochastic rounding operation of the system in accordance with an embodiment;

DETAILED DESCRIPTION

Figure 2:
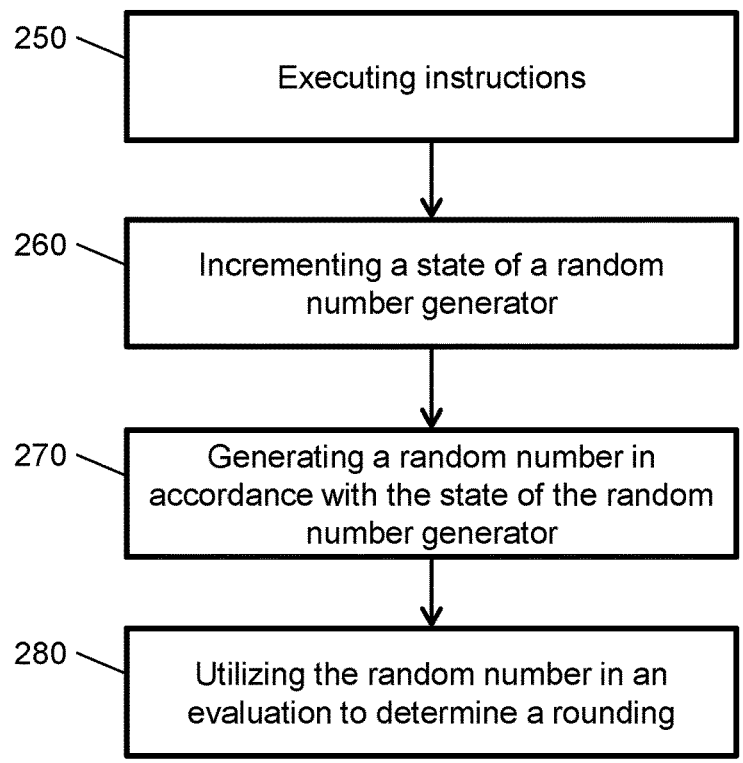
FIG. 2 illustrates a process flow for generating a random number within a stochastic rounding operation in accordance with an embodiment.

In view of the above, embodiments of the present invention disclosed herein may include a system, method, and/or computer program product (herein the system) that provides reproducible stochastic rounding for out of order processors. That is, using a part of an instruction that is not subject to remapping a virtual machine of the system (e.g., an offset in a page), as an input to a random hash, and a state-driven random number generator of the system that increments a state on each branch taken, the system can create random numbers for stochastic rounding operation. The random numbers, which result from stochastic rounding, are reproducible when a thread is executed at a later time by the same processor or different processors. Thus, embodiments herein generate reproducible random numbers in a computer system in an area efficient way by creating that random number from a hash of the instruction address (e.g., which is already contained in the processor for other purposes) and a small state driven random number generator.

In general, a rounding operation takes place following an arithmetic operation such as addition, multiplication, subtraction, division, that creates an exact result that contains more digits then the target precision, referred as an intermediate result. Other instructions that change the format of an operand to a shorter precision format may also require rounding. Stochastic rounding is a method of rounding that increments or truncates the intermediate result to the target precision based on a stochastic process of the portion of the intermediate result not contained in the final result. An example is for the multiplication of two operands to generate an intermediate result. The operands generally have the same number of bits. The intermediate result due to the multiplication includes a higher number of bits than either of the individual operands. Since most instructions require the system to continue utilizing a same format (e.g., the same number of bits as the original operands), the intermediate result is then rounded to generate a final result with the format of the operands. The system rounds the intermediate result up or down based on a random number that preserves a full probability distribution of the rounded intermediate result. A full probability distribution links each outcome (e.g., the rounded intermediate result) of a stochastic rounding operation with a probability of occurrence (e.g., in accordance with rounding the intermediate result up or down based on a random number).

Turning now to FIG. 1, an example of a stochastic rounding operation of the system is illustrated in accordance with an embodiment. In FIG. 1, the operands can be two 64-bit operands A and B. By multiplying these operands together, a 128-bit intermediate result 110 is produced (e.g., A*B=C, where A=a first 64 bit operand, B=a second 64 bit operand, and C=a 128-bit intermediate result). The intermediate result 110 is rounded based on a random number 120 to a 64-bit final result 130 (e.g., D=C rounded to a 64-bit final result based on R, where R is the random number 120). Particularly, result 110 is rounded up or down at bit 140 based on the random number 120. Operationally, all of the bits to the right of the decimal of the intermediate result 110 are being added to all of the bits of the random number 120. If the result of this addition causes a one to carry over to the first bit 140 to the left of the decimal point 140 of the intermediate result 110, then the 64-bit final result 130 is rounded up (e.g., incremented). If the result of this addition causes a zero to carry over to the first bit to the left of the decimal of the intermediate result 110, then the then the 64-bit final result 130 is rounded down (e.g., not incremented).

Turning now to FIG. 2, a process flow 200 is generally shown for generating random numbers 120 within the stochastic rounding operation in accordance with an embodiment. The process flow 200 begins at block 250, where the system executes instructions. The instructions cause operands to be operated on, those operation may include arithmetic operations such of addition, multiplication, subtraction, division, or logic operations or other operations commonly executed in microprocessor systems. Each one of the plurality of intermediate results may require rounding, one such rounding processes being stochastic rounding where intermediate results are rounding in a way to preserve a full probability distribution.

At block 260, the system increments a state of a random number generator. The state of the random number generator is a configuration that is used as an input to track output of the random number generator. The state of the random number generator can be started from an arbitrary initial state, such as by using a seed state. The random number generator increments the state in correspondence with each intermediate result. In an embodiment, a state of the random number generator may be set to a prior state. In the case of a branch wrong, a return can be made to an earlier point in the instruction stream and therefore the random number generator state can return to the value it was in prior to the branch point. In another embodiment, the state of the random number generator can be loaded. When the instruction stream initializes, or if it is swapped out of the processor and returns to it at a later time, the random number generator can be set to a known correct initial value from which it then increments.

At block 270, the system generates a random number in accordance with the state of the random number generator. Thus, a plurality of random numbers are generated, where each random number corresponds to one of the plurality of intermediate results based on the correspondence between each incremented state of the random number generator and the plurality of intermediate results.

At block 280, the system utilizes each random number in an evaluation to determine a rounding. In this way, each of the plurality of intermediate results can be incremented or truncated while preserving a full probability.

Figure 3:
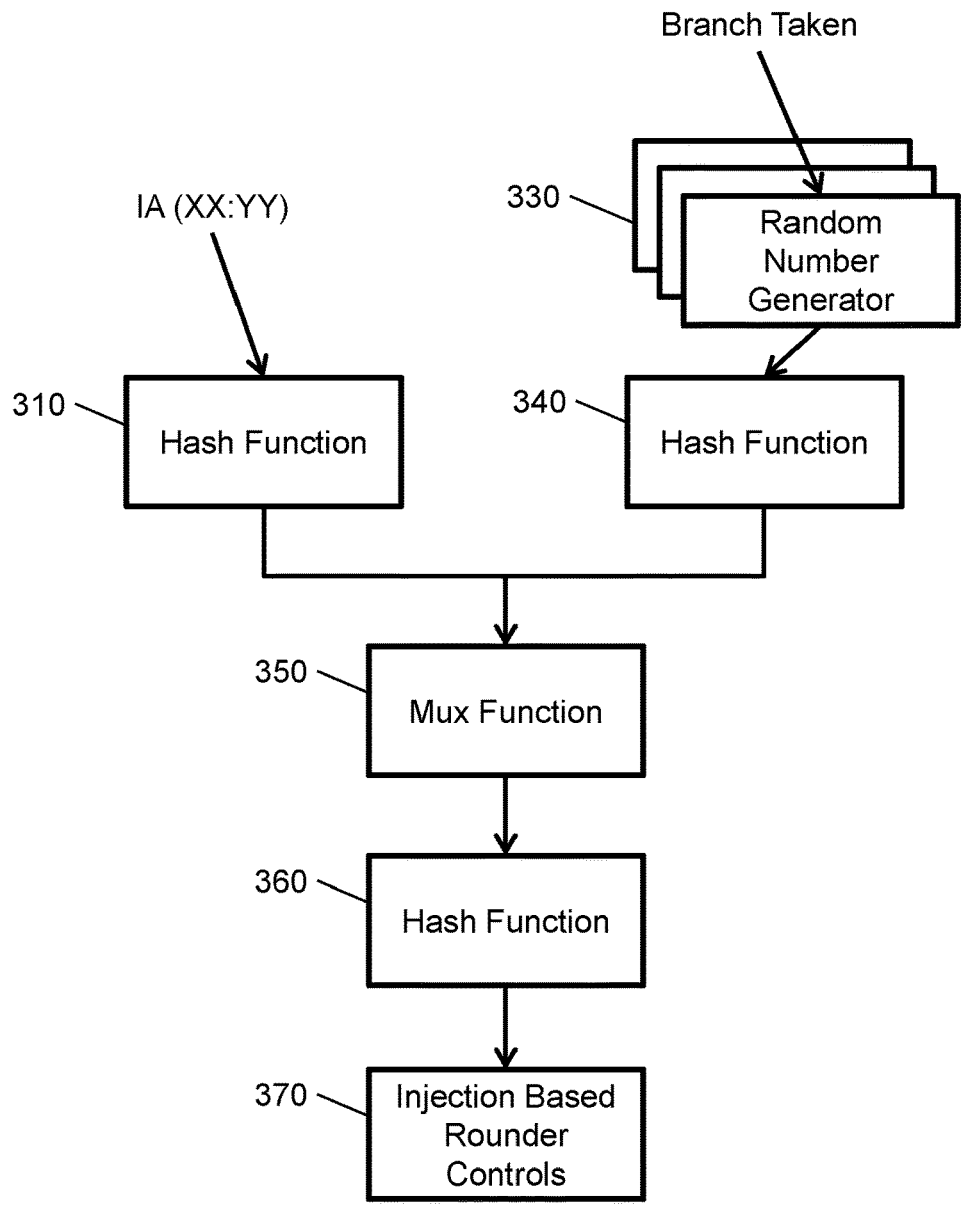
FIG. 3 illustrates a process flow for generating reproducible stochastic functions in accordance with an embodiment.

Turning now to FIG. 3, a process flow 300 is generally shown for generating reproducible stochastic functions in accordance with an embodiment. The process flow 300 particularly illustrates stochastic rounding for arithmetic operations. The process flow 300 begins as block 310, where an Instruction Address (IA) is passed to a first hash function. Bits of the IA are represented as XX:YY and can be any addressing within a page of memory that is not alterable by a virtual address translation mechanism of the system.

At block 330, a random number generator is used to generate a hash input. An example of the random number generator includes a linear feedback shift register (LFSR), such as a 64-bit LFSR. The 64-bit LFSR can be used to generate a 64-bit random number and can step through a predetermined set of $2^n-1$ states. At block 340, second hash function receives the hash input from the random number generator. Note that each time a branch is taken, the random number generator is incremented, changing the random numbers generated at each IA. If a branch is taken wrong, a previous state of the random number generator can be restored.

At block 350, the bits of the AI (e.g., 8 bits) can be used as a first input into a muxing function (e.g. a multiplexing operation).The output of 340 is operated on in 350 and pass onto Hash Function 360. Note that in this way, the system utilizes more than IA, but also a random number based on 330 such that all addresses at a given offset within a page would not generate the same random value for rounding (e.g., in a loop, the same random numbers would be used at each pass of the loop if 330 and hash functions it effected were not included).

At block 360, an output of the muxing function is passed to a third hash function. At block 370, an output of the third hash function is passed to an adder where it is added to the part of the intermediate result that is to the right of the decimal point of the final result (the part getting rounded off). The carry-out of this adder is sent to the injection based rounding control of the main adder performing the correctly rounded result of the final part of the In an embodiment, block 360 can include an output to an adder. The adder adds this output with the part of an intermediate result getting rounded. Further, a carry out of the adder can be s an input into the injection based rounder control. In another embodiment, the adder can exist and this addition can take place within block 370, with the carry out being used.

Note that a state of the random number generator can be loaded at thread initialization. In turn, the state is saved and/or restored as part of a processor state during context switches. This creates a random stochastic input needed for a computational environment and provides the reproducible execution result required for validation, verification, and for future standards defining stochastic operations in the system.

Figure 4:
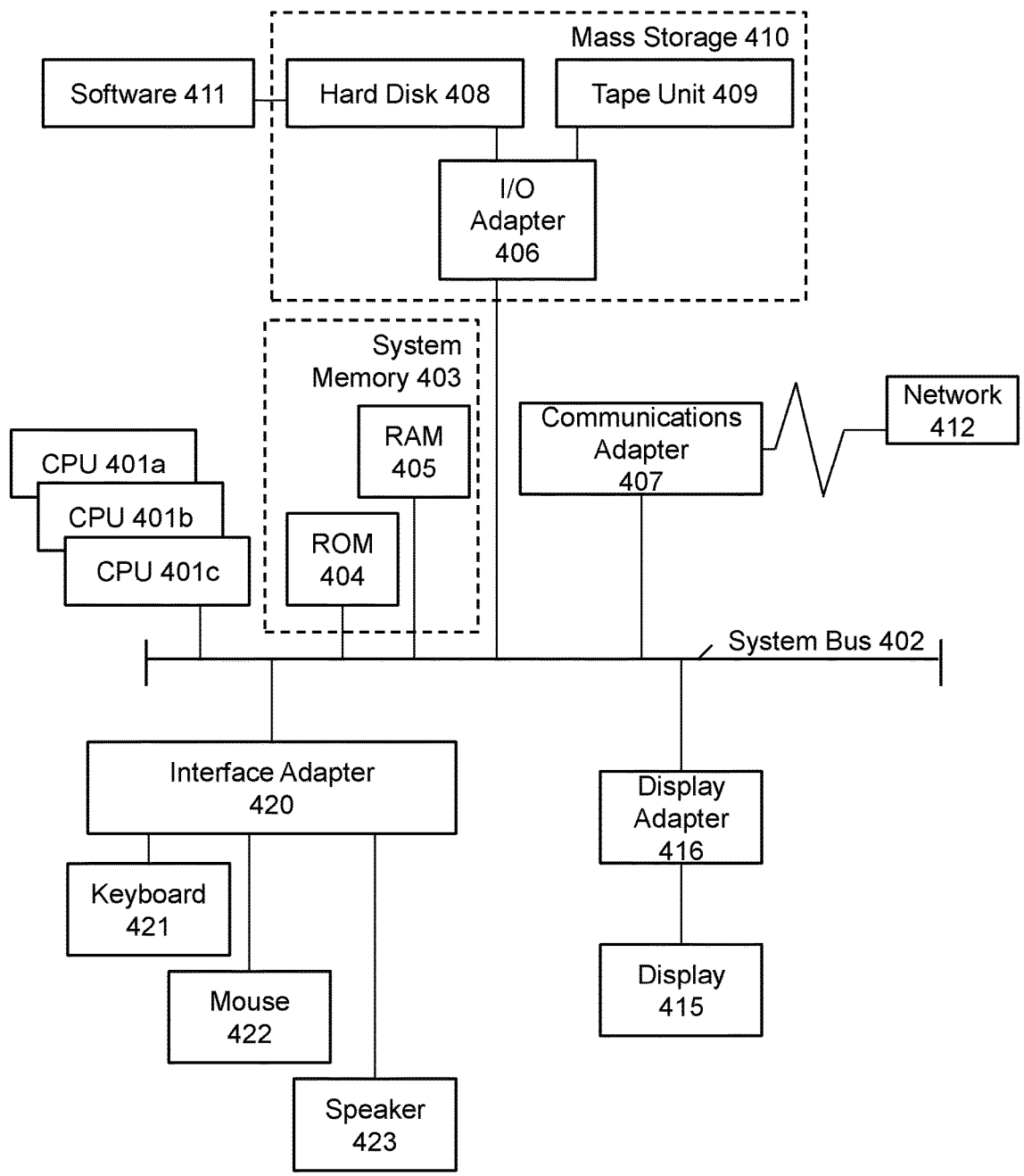
FIG. 4 illustrates a processing system in accordance with an embodiment.

Referring now to FIG. 4, there is shown an embodiment of a processing system 400 for implementing the teachings herein. In this embodiment, the processing system 400 has one or more central processing units (processors) 401a, 401b, 401c, etc. (collectively or generically referred to as processor(s) 401). The processors 401, also referred to as processing circuits, are coupled via a system bus 402 to system memory 403 and various other components. The system memory 403 can include read only memory (ROM) 404 and random access memory (RAM) 405. The ROM 404 is coupled to system bus 402 and may include a basic input/output system (BIOS), which controls certain basic functions of the processing system 400. RAM is read-write memory coupled to system bus 402 for use by processors 401.

FIG. 4 further depicts an input/output (I/O) adapter 406 and a network adapter 407 coupled to the system bus 402. I/O adapter 406 may be a small computer system interface (SCSI) adapter that communicates with a hard disk 408 and/or tape storage drive 409 or any other similar component. I/O adapter 406, hard disk 408, and tape storage drive 409 are collectively referred to herein as mass storage 410. Software 411 for execution on processing system 400 may be stored in mass storage 410. The mass storage 410 is an example of a tangible storage medium readable by the processors 401, where the software 411 is stored as instructions for execution by the processors 401 to perform a method, such as the above process flows. Network adapter 407 interconnects system bus 402 with an outside network 412 enabling processing system 400 to communicate with other such systems. A screen (e.g., a display monitor) 415 is connected to system bus 402 by display adapter 416, which may include a graphics controller to improve the performance of graphics intensive applications and a video controller. In one embodiment, adapters 406, 407, and 416 may be connected to one or more I/O buses that are connected to system bus 402 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 402 via an interface adapter 420 and the display adapter 416. A keyboard 421, mouse 422, and speaker 423 can be interconnected to system bus 402 via interface adapter 420, which may include, for example, a Super I/O chip integrating multiple device adapters into a single integrated circuit.

Thus, as configured in FIG. 4, processing system 405 includes processing capability in the form of processors 401, and, storage capability including system memory 403 and mass storage 410, input means such as keyboard 421 and mouse 422, and output capability including speaker 423 and display 415. In one embodiment, a portion of system memory 403 and mass storage 410 collectively store an operating system, such as the z/OS or AIX operating system from IBM Corporation, to coordinate the functions of the various components shown in FIG. 4.

Technical effects and benefits include managing hardware mechanisms to create cross platform reproducible results that can be utilized in hardware testing, code validation, computational biochemistry (e.g., protein and gene folding), cognitive computing, etc. Thus, embodiments described herein are necessarily rooted in the system to perform proactive operations to overcome problems specifically arising in the realm of rounding results using a random value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing hardware mechanisms to create cross platform reproducible results that can be utilized in hardware testing, code validation, computational biochemistry, and cognitive computing, the managing hardware mechanisms comprising generating a random number for use in a stochastic rounding operation executed by a processor coupled to a memory, the method comprising:

setting a state of a random number generator to a known correct initial value upon initializing an instruction, wherein the known correct initial value comprises an instruction address contained in the processor that is not alterable by a virtual address translation, wherein the state of the random number generator is a configuration used as an input to track output of the random number generator;

multiplying at least two operands to produce an intermediate result, wherein the random number generator increments the state in correspondence with the intermediate result and on each branch taken, wherein the random number generator sets the state to a prior state in the case of a branch wrongly taken;

causing the random number generator to generate the random number in accordance with the state from a hash of the known correct initial value, wherein the random number preserves a full probability distribution of a rounding of the intermediate result; and producing a final result by utilizing the random number to determine the rounding of the intermediate result, wherein the final result comprises a same number of bits as one of the at least two operands, wherein a least significant bit of the final result is rounded up or down based on:

when an addition of the random number and the intermediate causes a carry over to the least significant bit of the final result then the least significant bit is rounded up, and when an addition of the random number and the intermediate does not cause a carry over to the least significant bit of the final result then the least significant bit is rounded down.

\* \* \* \* \*